United States Patent [19]

Covington et al.

[11] Patent Number: 4,553,232

[45] Date of Patent: Nov. 12, 1985

[54] CLAMPING DEVICE FOR OPTICAL DISK ASSEMBLIES

[75] Inventors: Roger G. Covington; Stephen H. Miller, both of Rochester, N.Y.

[73] Assignee: Eastman Kodak Company, Rochester, N.Y.

[21] Appl. No.: 458,491

[22] Filed: Jan. 17, 1983

[51] Int. Cl.⁴ .................... G01D 15/32; G11B 7/24
[52] U.S. Cl. .................... 369/287; 346/135.1; 346/137; 360/99; 360/135; 369/271; 369/284; 369/286
[58] Field of Search .............. 369/284, 286, 287, 270, 369/271; 346/135.1, 137; 220/256, 257, 258; 360/100, 99, 135

[56] References Cited

U.S. PATENT DOCUMENTS

| | | | |
|---|---|---|---|
| 3,373,413 | 3/1968 | Treseder | 360/135 |
| 3,608,909 | 9/1971 | Rabinow | 369/271 |
| 3,805,292 | 4/1974 | Hashiguchi et al. | 360/135 |
| 4,022,478 | 5/1977 | Stewart | 369/270 |
| 4,365,258 | 12/1982 | Geyer et al. | 369/284 |
| 4,464,670 | 8/1984 | Leonard et al. | 346/137 |

FOREIGN PATENT DOCUMENTS 1005103  9/1965  United Kingdom ............... 360/135

Primary Examiner—Steven L. Stephan
Attorney, Agent, or Firm—Milton S. Sales

[57] ABSTRACT

A device is disclosed for clamping disk assemblies in a manner to impart constant tension to a support web and cover sheet, while assuring easy and quick loading and unloading of the assembly. The optical disk assembly includes a web assembly including a flexible disk-shaped support web and preferably an opposed cover sheet. An annular retaining ring engages the web assembly around its periphery. The support web carries a record layer with an information storage region. The optical disk assembly is mounted on a reference structure. The web assembly is drawn over an annular locating surface integral with the reference structure to subject the web assembly to circumferentially-symmetric tension. The tension may be constant or, in some embodiments of the invention, may be changeable from a low "storage" tension to a higher "operating" tension. Clamping elements are movable radially over the optical disk assembly from a retracted position.

2 Claims, 17 Drawing Figures

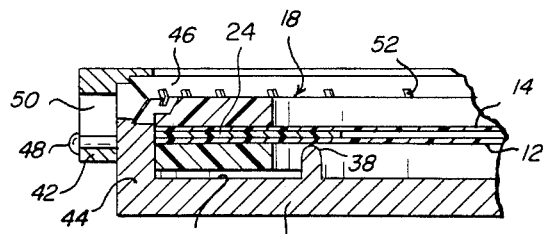
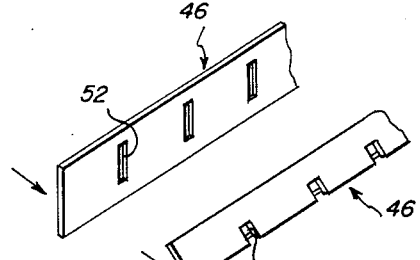
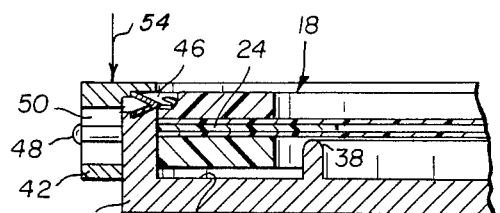
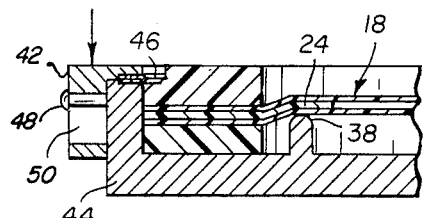
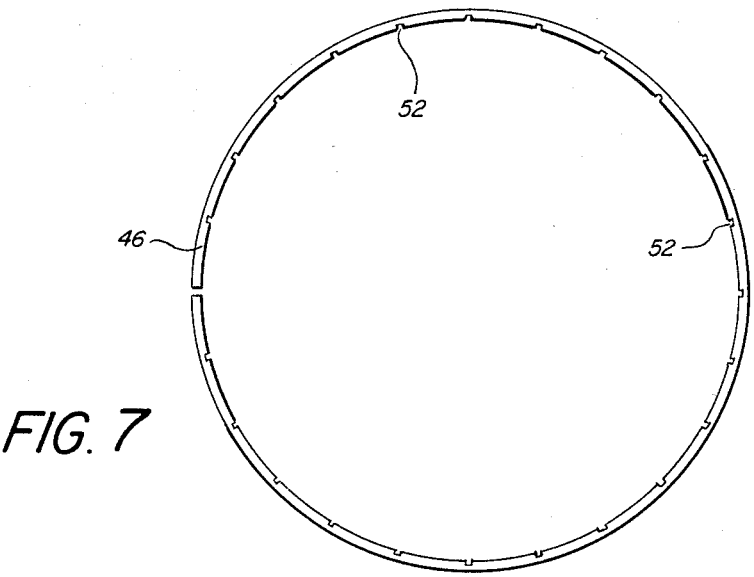

CLAMPING DEVICE FOR OPTICAL DISK ASSEMBLIES

CROSS-REFERENCE TO RELATED APPLICATIONS

Reference is made herein to commonly-assigned, copending U.S. patent application Ser. No. 458,495, filed concurrently herewith in the names of D. G. Howe and S. H. Miller and entitled TWO-SIDED OPTICAL DISK ASSEMBLY COMPOSITE now abandoned.

BACKGROUND OF THE INVENTION

1. Field of the Invention

The present invention relates to optical disk assemblies useful in high density storage of information by optical writing and/or reading, and more particularly to improved means for clamping such assemblies to a reference structure.

2. Description of the Prior Art

The currently preferred optical disk technology employs disk elements with spiral or concentric tracks of minute (e.g., on the order of a micron or less in size), optically-detectable marks. One real-time mode of recording (writing) such marks is by scanning tracks on the disk with an equivalently small beam of radiation (e.g., from a laser) which is modulated "off or on" according to an electrical signal representative of the information to be written. Information is recovered (read) by scanning the tracks with the same size or only slightly larger, but still very tightly focused, radiation (e.g. light) spot. The recovered information is in the form of a fluctuating electrical signal obtained from a photodetector that senses the read-out light reflected from the recorded disk.

In order to write and read information in the form of such minute markings, optical systems of high numerical aperture are used to focus light to equivalently minute spots. Such optical systems have extremely small depths of focus and the proper positional relation between the writing or reading optical system, and the optical disk record surface must be stringently maintained both smooth and flat.

One approach to achieve requisite smoothness and flatness has been to form the disk substrate of glass with a ground and polished surface. This requires a time-consuming and costly fabrication procedure. Another approach is to mold a plastic disk substrate with a highly finished surface and apply a surface smoothing sublayer. However, it is extremely difficult to mold such plastic disks having adequate surface characteristics with a good yield; and this support fabrication method is also relatively costly.

Still another approach for meeting smoothness, flatness and protective requirements is disclosed in commonly-assigned U.S. Pat. No. 4,365,258, issued Dec. 21, 1982 to F. F. Geyer and E. M. Leonard. In that approach an improved optical disk assembly adapted for high density storage of information comprises (i) a flexible, disk-shaped support web carrying a record layer; (ii) a transparent disk cover sheet opposing the record layer, and (iii) an annular retaining ring for holding the support web and cover sheet, collectively referred to as the web assembly, in a relatively low circumferentially-symmetric tension and tensioned to an operating tension when drawn over a rotatable annular locating surface on the disk assembly receiving structure of the optical disk write/read apparatus. Thus the disk assembly can normally be kept with the web assembly in low "storage" tension, and used with the web assembly in higher "operating" tension to enhance flatness.

This approach requires that the web assembly be drawn over the annular locating surface and securely clamped. However, ease of changing disk assemblies is important to maximize user convenience. The present invention provides for clamping tensioned web assemblies over annular locating surfaces while providing maximum ease in loading and unloading the assemblies.

SUMMARY OF THE INVENTION

The present invention is an improvement over prior art a device for clamping disk assemblies in a manner to impart constant tension to the support web and cover sheet, while assuring easy and quick loading and unloading of the assembly.

An optical disk assembly for use with the apparatus of the invention includes a web assembly including a flexible disk-shaped support web and preferably an opposed cover sheet. An annular retaining ring engages the web assembly around its periphery. The support web carries a record layer with an information storage region.

In accordance with the present invention, such an optical disk assembly is mounted on a reference structure. The web assembly is drawn over an annular locating surface integral with the reference structure to subject the web assembly to circumferentially-symmetric tension. The tension may be constant or, in some embodiments of the invention, may be changeable from a low "storage" tension to a higher "operating" tension.

It is a feature of the invention that clamping elements are movable radially over the optical disk assembly from a retracted position. This provides for rapid removal and replacement of disk assemblies and maximum user convenience, while keeping costs to the manufacturer of write/read apparatus to a minimum.

The invention and its objects and advantages, will become more apparent in the detailed description of the preferred embodiments presented below.

BRIEF DESCRIPTION OF THE DRAWINGS

The description of preferred embodiments refers to the attached drawings wherein:

FIGS. 4–6 are sequential sectional views of optical disk write/read apparatus in accordance with the present invention together with a sectional view of the optical disk assembly of FIG. 1;

FIG. 7 is a top view of a portion of the optical disk write/read apparatus of FIGS. 4–6;

FIGS. 8 and 9 are fragmented perspective views of a part used to form the portion of the optical disk write/read apparatus portion shown in FIG. 7;

DESCRIPTION OF THE PREFERRED EMBODIMENTS

Figure 1:
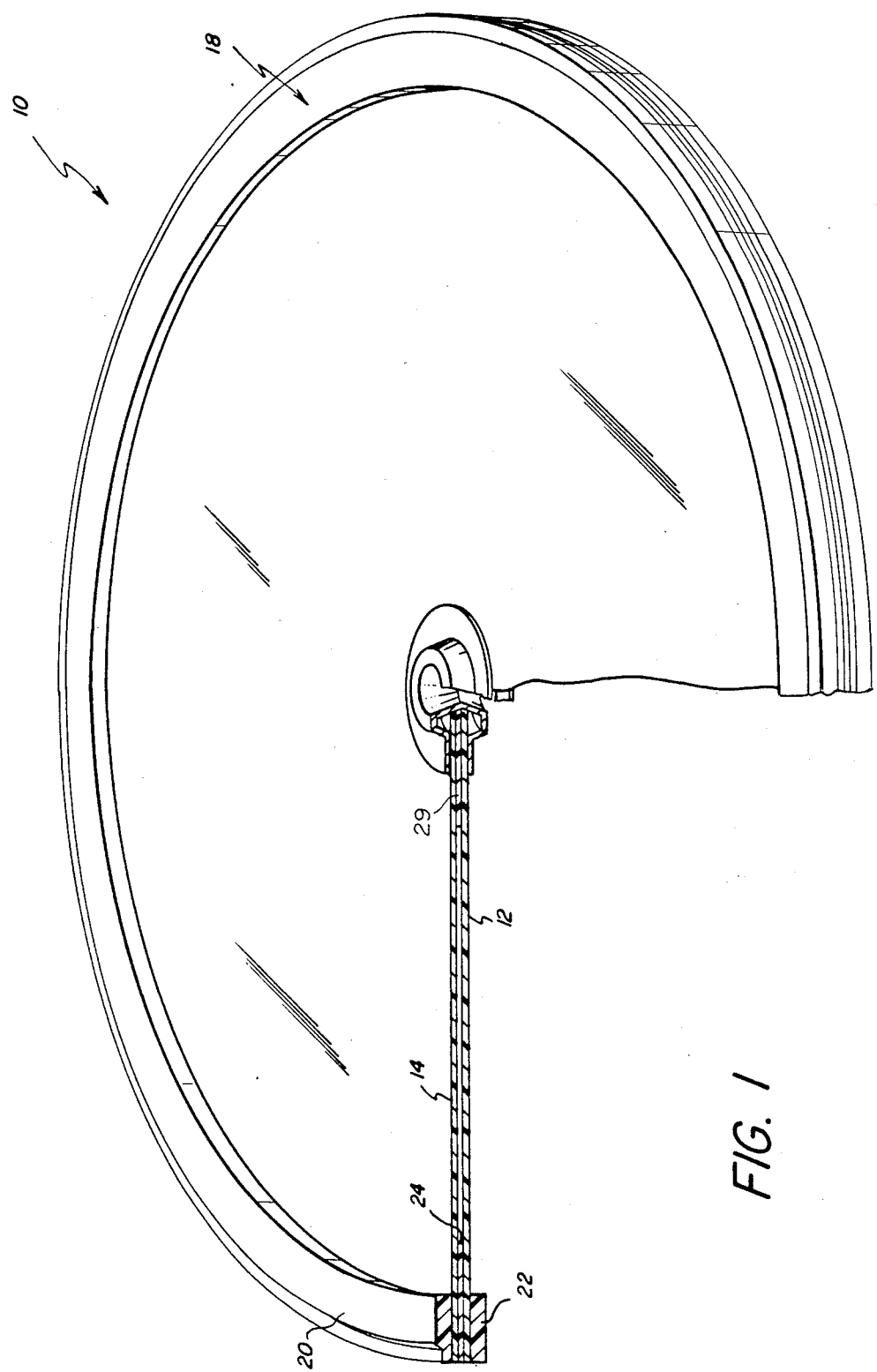
FIG. 1 is a fragmented perspective, schematic view of an optical disk assembly particularly suited for use with the present invention.

Referring to schematic FIG. 1, an optical disk assembly 10 includes a flexible, disk-shaped support web 12 having a record layer (and other appropriate layers) on one major surface of the support web. The disk assembly may also include a continuous, flexible, disk-shaped cover sheet 14 which is substantially transparent with respect to the write and/or read wavelength suitable for use with the record layer. The diameter of cover sheet 14 corresponds generally to the diameter of support web 12, and collectively the support web and cover sheet (if provided) are referred to herein as the web assembly.

The support web and cover sheet are held in spaced relation by a central hub 16 and an annular retaining ring 18, the latter of which engages the web assembly substantially continuously around the annular peripheral portion thereof. The record layer has a predetermined annular information storage region radially intermediate hub 16 and retaining ring 18. Reference is made to aforementioned U.S. Pat. No. 4,365,258 for a description of useful and preferred materials and characteristics for the support and the cover sheet.

The web assembly is retained in circumferentially-symmetric tension by cooperating annular ring members 20, 22 and spacer 24 of retaining ring 18. It is preferred that the cooperative engagement between the web assembly, hub 16 and retaining ring 18 significantly seal the space between the record layer on support web 12 and the opposed surface of cover sheet 14.

Preferred tensions for the disk-shaped support web and cover sheet materials are from substantially zero to just below the elastic limit, or yield point, of those materials. More specifically, the preferred tension depends upon the desired degree of planarity for the particular member (i.e. size, composition, etc.) used. It is preferred that "storage" and "operating" support web material tensions be below the elastic limit of the particular material; however, in certain applications some yield can be acceptable as long as surface planarity remains in the desired tolerance. In general, the tension (particularly storage tension) should be selected with respect to the support material so that the stressed material's continuous relaxation over time (i.e. material creep) is slow enough to insure adequate spacing and planarizing tension throughout the expected product life period.

Figure 3:
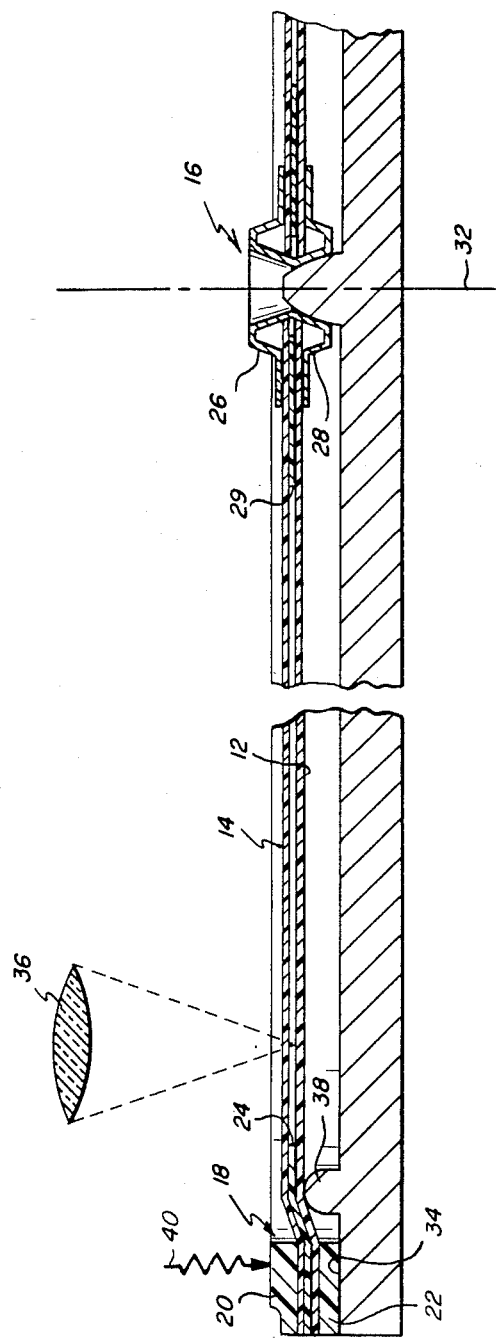
FIG. 3 is a sectional view of the optical disk write/read apparatus of FIG. 2, together with a sectional view of the optical disk assembly of FIG. 1.

Several examples of suitable retaining rings are disclosed in the aforementioned copending U.S. patent. Generally, the retaining ring has means for engaging support web 12 and cover sheet 14, and for holding them in spaced relation under circumferentially-symmetric tension. Details of hub 16 are best seen in FIG. 3, where the hub includes upper and lower parts 26 and 28, respectively, sealed together at their inner edges. An annular spacer 29 keeps support web 12 and cover sheet 14 apart at the hub.

Figure 2:
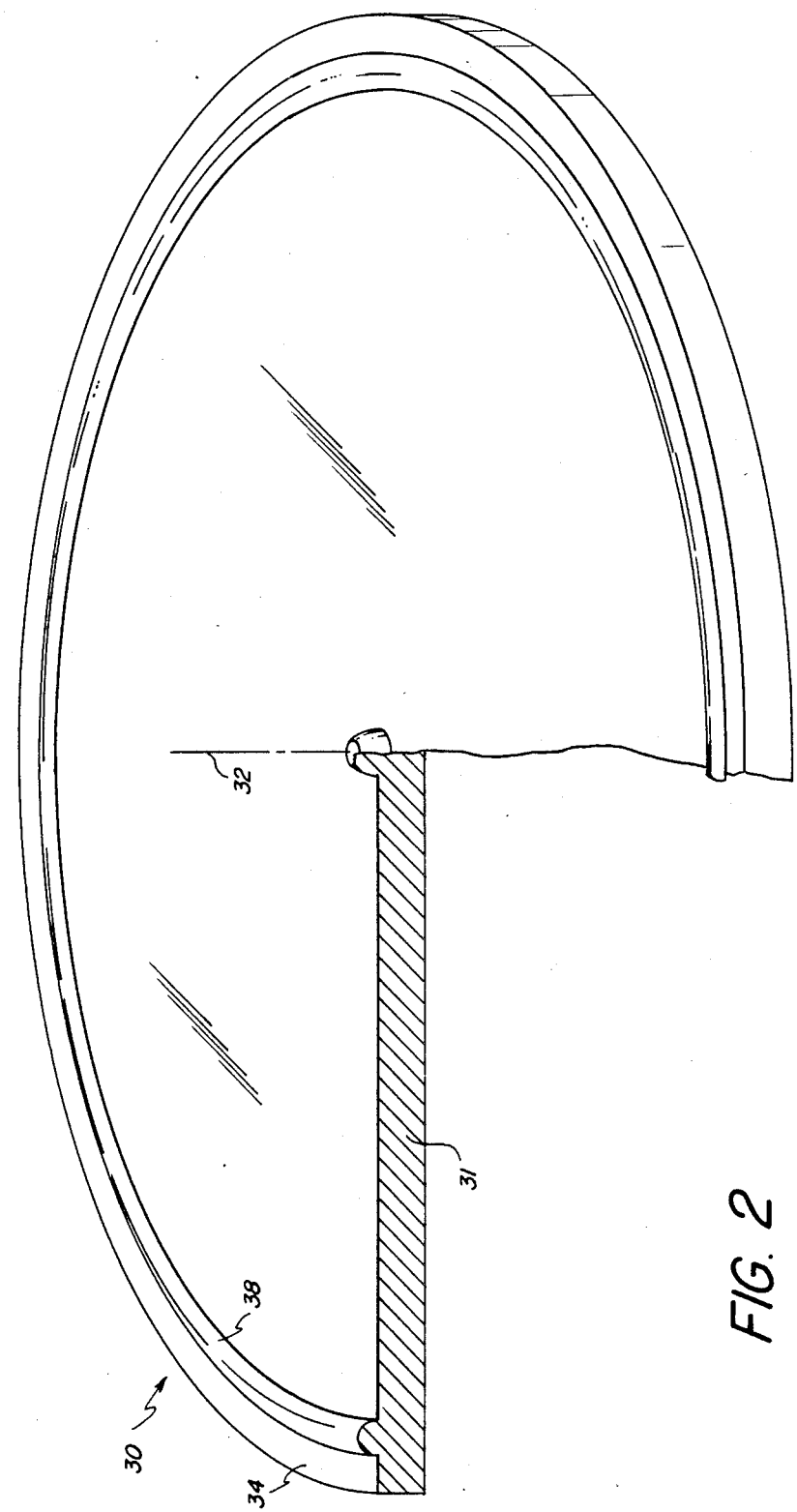
FIG. 2 is a fragmented perspective view of a portion of an optical disk write/read apparatus.

FIGS. 2 and 3 show a disk assembly reference structure 30 of cooperating optical disk write/read apparatus useful in combination with the above-described optical disk assembly. The optical disk write/read apparatus is similar to the various other optical disk write/read apparatus known in the art, and only the disk assembly reference structure 30 which cooperates more directly with the disk assembly will be described in detail.

Disk assembly reference structure 30 in the illustrated embodiment is a platen 31 adapted for rotation about axis 32 by drive means (not shown). Platen 31 includes a clamping surface 34 in a plane generally normal to axis 32 and engageable by ring member 18 of the disk assembly (FIG. 3) and a spindle 35 engageable by hub 16. The optical disk write/read apparatus also includes an optics system, represented by lens 36, which is adapted to focus write/read light in a focal plane that is normal to axis 32.

An annular locating surface 38 on platen 31 rotates in a plane substantially normal to axis 32. Locating surface 38 is located to engage support web 12 in an annular area which is radially outward of the annular information storage region of the record layer. The locating surface has a predetermined dimension with respect to the focal plane of the optics system of the disk write/read apparatus and the thickness of support web 12 so that the recording layer of a disk assembly located on the reference structure will closely proximate a nominal focal plane position of lens 36.

The relation of clamping surface 34 and locating surface 38 is such that the web assembly is further tensioned in a circumferentially-symmetric manner when mounted on the reference structure because the web assembly is at that time positioned in a predetermined tensioning relation with annular locating surface 38. In FIG. 3, retaining ring 18 is shown being clamped to surface 34 by a schematic force arrow 40. Specific clamping mechanisms which form part of the present invention will now be described in detail.

FIGS. 4–6 show sequential views of one embodiment of a clamping device in accordance with the present invention. A slotted clamp ring 42 is axially slidable over an annular shoulder 44 on platen 31 radially outwardly of clamping surface 34. Ring 42 is urged upwardly by a spring 46, shown in top view in FIG. 7. Axial travel of ring 42 is limited, such as for example by a series of pins 48 which extend through slots 50 around the ring.

Spring 46 is made from a strip of suitable steel as shown in FIG. 8. The steel strip is creased (FIG. 9) and then formed into a circle (FIG. 7). A plurality of slots 52 assist in bending the folded strip.

With clamp ring 42 raised to the position shown in FIG. 4, spring 46 is entirely radially outward of the path of retaining ring 18 when it is mounted onto or removed from turntable 31. Thus, FIG. 4 illustrates a load or unload mode of the mechanism. Once the disk assembly is loaded, it is locked on the turntable by depressing clamp ring 42 to the position shown in FIG. 5, and by holding the ring in that position by suitable means, schematically shown by arrow 54. Note that spring 46 has been further bent and now extends above retaining ring 18. Support web 12 of disk assembly 10 is shown in engagement with locating surface 38, but it is not stretched around the surface. Thus, the webs of the disk assembly remain in their "storage" tension modes.

Further depression of clamp ring 42 forces retaining ring 18 into firm contact with clamping surface 34. The web assembly is further tensioned in a circumferentially-symmetric manner about locating surface 38. The web assembly can be shifted between its "storage" and its "operating" tensions by moving clamping ring 42 to its FIG. 5 and FIG. 6 positions, and the disk assembly can be removed and replaced by raising the clamping ring to its FIG. 4 position.

In commonly-assigned, copending U.S. patent application Ser. No. 458,495, now abandoned filed concurrently herewith in the names of D. G. Howe and S. H. Miller, and entitled TWO-SIDED OPTICAL DISK ASSEMBLY COMPOSITE, a reference structure is disclosed which can be used with two disk assemblies such as shown in FIG. 1 to form an assembly composite suitable for mounting on write/read apparatus capable of accessing both sides of the composite.

Reference structure 54 (FIG. 10) is a rigid member exhibiting high dimensional stability. It may be molded from a suitable polymer, formed or cast from metal, or machined from stock. Outer and inner rims 56 and 58 extend above and below a planar region 60, as do annular outer and inner locating surfaces 62 and 64, respectively.

Figure 10:
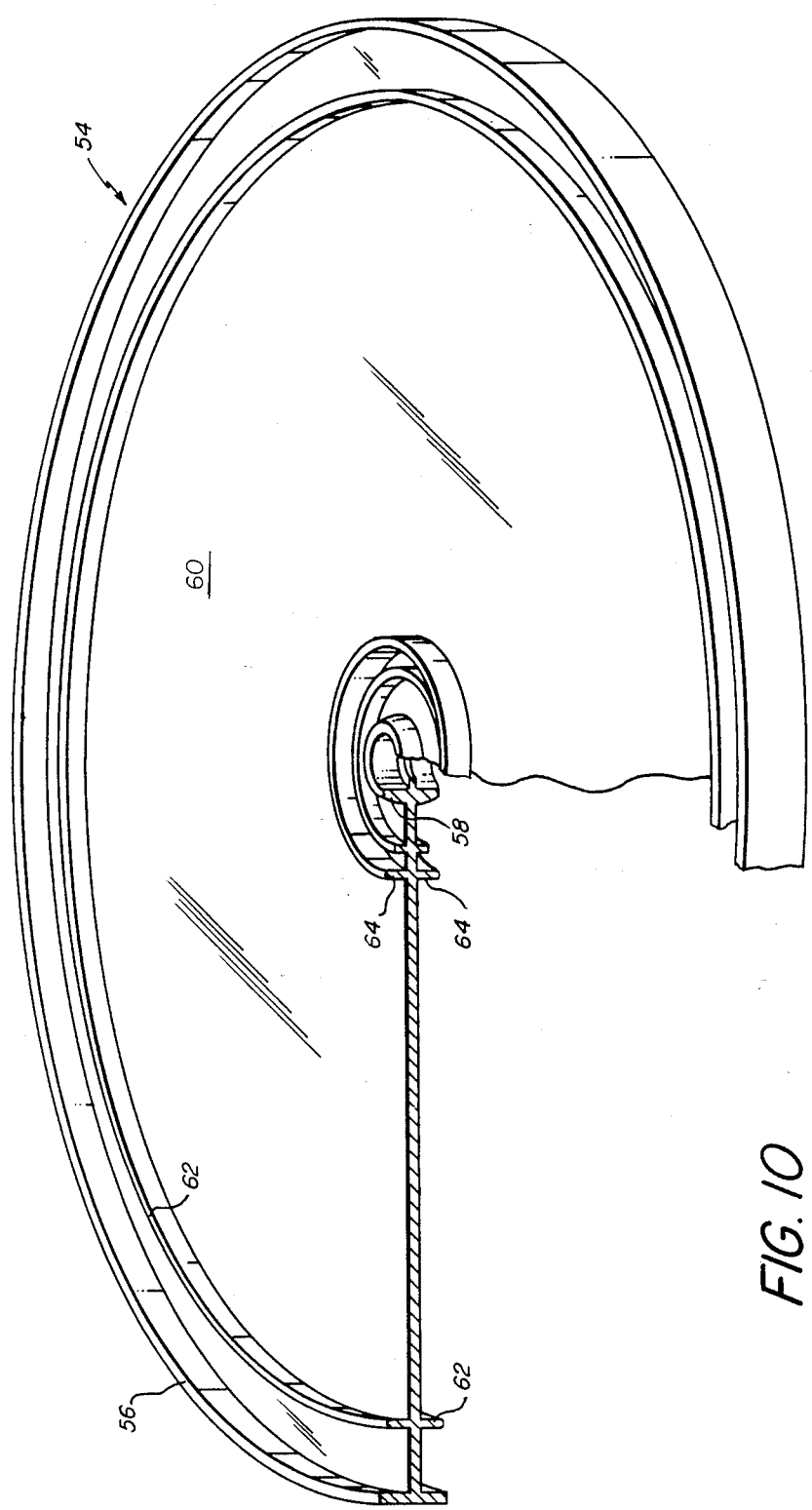
FIG. 10 is a fragmented perspective view of a platen suited for use with the present invention.
Figure 11:
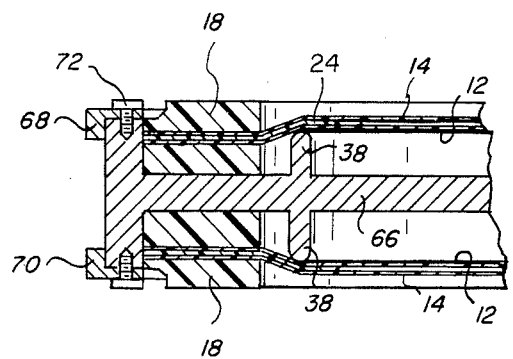
FIG. 11 is a fragmented perspective view of a platen, two disk assemblies, and clamping device in accordance with a second embodiment of the present invention.
Figure 12:
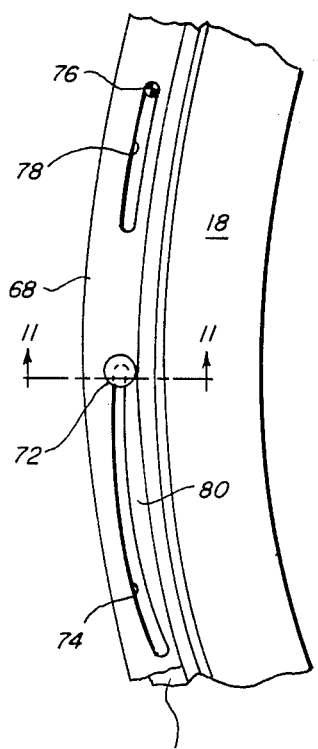
FIGS. 12 and 13 are top views of the apparatus shown in FIG. 11 with the parts in different positions.
Figure 13:
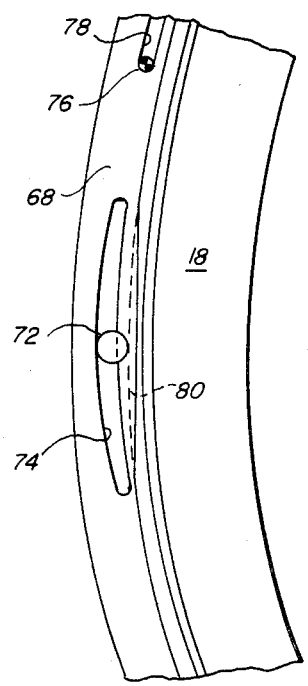

The clamping device shown in FIGS. 4-9 is suitable for holding disk assemblies to reference structure 54 of FIG. 10 by associating a clamping device with each of the two disk assemblies. FIGS. 11-13 illustrate another embodiment of the present invention wherein two clamping devices are mounted on a reference structure 66 similar to that shown in FIG. 10.

A cam ring 68 and 70 is secured to each side of reference structure 66 by a series of cam pins 72 which extend through camming slots 74 into reference structure 66. At least one stop pin 76 on reference structure 66 extend through a slot 78. Slot 78 permits rotation of cam ring 68 on reference structure 66 through an arc of 7°30' in the illustrated embodiment, from the position shown in FIG. 12 to that of FIG. 13.

To load disk assemblies onto reference structure 66, cam rings 68 and 70 are rotated to the position shown in FIGS. 11 and 12, with stop pin 76 at one end of slot 78 and cam pins 72 at one end of slots 74. Retaining rings 18 of each disk assembly are pushed into reference structure 66 past cam rings 68 and 70. The support web 12 of each disk assembly engages a locating surface 38 on the reference structure, tensioning the support webs and cover sheets 14 in a circumferentially-symmetric manner.

Now, cam rings 68 and 70 are rotated on reference structure 66 to the position shown in FIG. 13. Stop pin 76 engages the other end of slot 78 to prevent further rotation. Noting that slots 74 have a smaller radius of curvature than clamp rings 68 and 70, it is clear that cam pins 72 will deflect portions 80 of cam rings 68 and 70 radially inwardly over the retaining rings of the disk assemblies; preventing removal of the disk assemblies until the cam rings are returned to their other rotational positions, providing for rapid removal and replacement of disk assemblies.

FIGS. 14-17 show still another embodiment of the clamping device according to the present invention. Reference structure 82 is provided with a cam ring 84 rotatable about the reference structure. A plurality of cam pins 86 extend through the cam ring into slots 88 in cams 90.

Cams 90 are rotatably held on reference structure 82 by pivot pins 92 such that the amount of rotation of cam ring 84 about the reference structure is defined by the lengths of slots 88. In the illustrated embodiment, that rotation is limited to 5° between the position shown in FIGS. 14 and 15 and the position shown in FIGS. 16 and 17.

Figure 15:
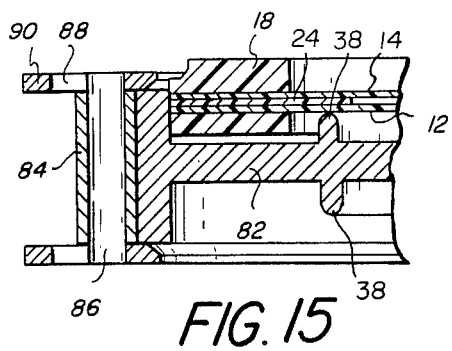
FIG. 15 is a sectional view taken along line 15—15 of FIG. 14.
Figure 14:
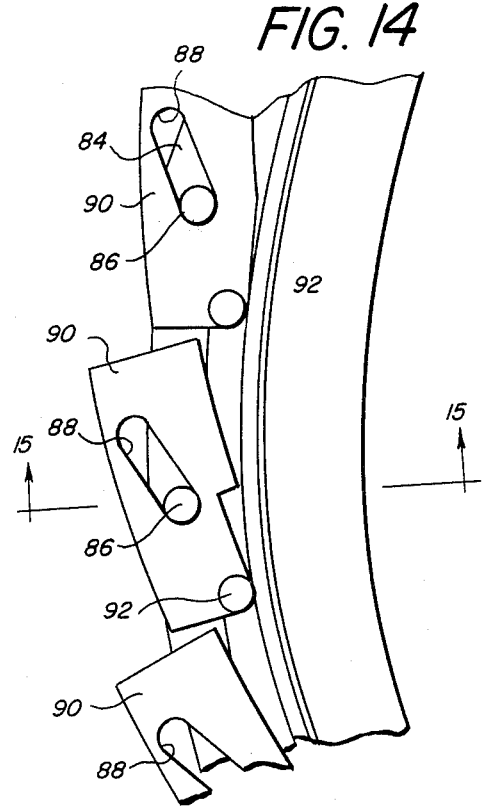
FIG. 14 is a top view of a clamping device in accordance with a third embodiment of the present invention.

To load disk assemblies onto reference structure 82, cam ring 84 is rotated to its FIG. 14-15 position. Cam pins 86 rotate cams 90 about pivot pins 92 to draw the cams radially outwardly. Retaining ring 18 of a disk assembly is pushed into reference structure 82. Although only one disk assembly is shown, two can be mounted on reference structure 82.

Figure 17:
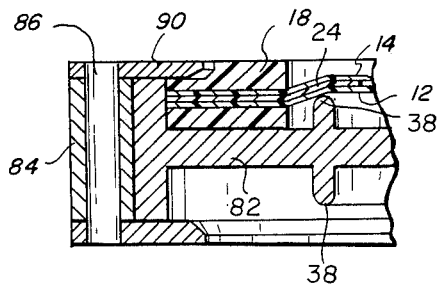
FIG. 17 is a sectional view taken along line 17—17 of FIG. 16.

The support web 12 of each disk assembly engages a locating surface 38 on the reference structure, tensioning the support web and cover sheet 14 in a circumferentially-symmetric manner (FIG. 17).

Figure 16:
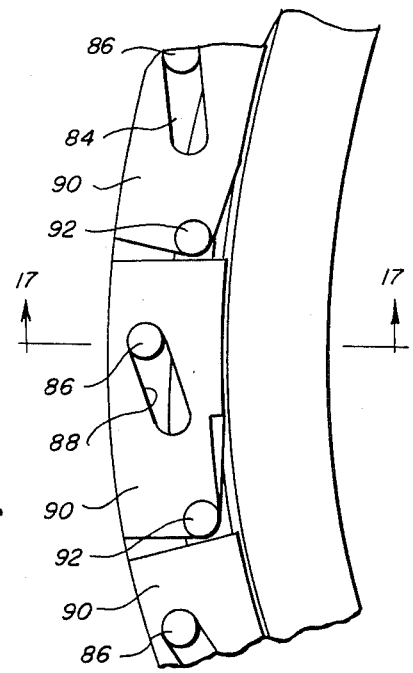
FIG. 16 is a top view of the clamping device of FIG. 14 showing the parts in a second position.

Now cam ring 84 is rotated about reference structure 82 to its FIG. 16-17 position. Cam pins 86 rotate cams 90 about pivot pins 92 until the cams extend radially over retaining ring 18 of the disk assembly.

The invention has been described in detail with particular reference to preferred embodiments thereof, but it will be understood that variations and modifications can be effected within the spirit and scope of the invention.

What is claimed is:

1. Optical disk write and/or read apparatus adapted for use with an optical disk assembly which includes (1) a flexible, disk-shaped support web carrying a record layer and (2) an annular retaining ring engaging the support around its peripheral region; said apparatus comprising:
(a) lens means for focusing light at a focal plane normal to a predetermined axis;
(b) an annular locating surface rotatable about said axis in a plane normal to said axis; and
(c) a clamping device for holding the annular retaining ring in a position bringing the support web into a predetermined abutting force against said locating surface 2. A reference structure usable with optical disk write and/or read apparatus and adapted to receive at least one optical disk assembly which includes (1) a flexible, disk-shaped support web carrying a record layer and (2) an annular retaining ring engaging the support around its peripheral region; said reference structure comprising:
(a) a platen having a central axis;
(b) an annular locating surface on said platen centered about said axis in a plane normal to said axis; and
(c) a clamping device for holding the annular retaining ring in a position bringing the support web into a predetermined abutting force against said locating surface to provide firm contact between the disk assembly support web and said locating surface, said clamping device including (1) clamping element means mounted on said platen for movement radially of said axis between a release position radially outward of the retaining ring and a clamp position radially aligned with the retaining ring and (2) cam means engageable with said clamping element means, one of said clamping element means and said cam means being rotatable about said axis for moving said clamping element means radially of said axis.

* * * * *